United States Patent [19]

Akiyama et al.

[11] 4,350,514
[45] Sep. 21, 1982

[54] METHOD FOR MANUFACTURING CATHODE RAY TUBES

[75] Inventors: Masatoshi Akiyama, Yotsukaidomachi; Shigeki Kitamura, Mobara; Junichi Tetsu, Mobara; Koichi Nakazato, Mobara, all of Japan

[73] Assignee: Hitachi, Ltd., Tokyo, Japan

[21] Appl. No.: 263,709

[22] Filed: May 14, 1981

[30] Foreign Application Priority Data

May 19, 1980 [JP] Japan ............................ 55-65406

[51] Int. Cl.³ .................... C03B 23/20; C03C 17/22; C03C 17/38
[52] U.S. Cl. ........................................ 65/36; 65/42; 65/43; 65/60.2; 65/60.3; 65/60.7; 427/64; 427/68; 427/73
[58] Field of Search .................. 65/60.2, 60.3, 60.7, 65/36, 42, 43; 427/64, 68, 73

[56] References Cited

U.S. PATENT DOCUMENTS 3,035,372  5/1962  Mayers ........................... 65/41 X
3,837,829  9/1974  Lebel ............................. 65/43 X

FOREIGN PATENT DOCUMENTS 53-123654  10/1978  Japan .

OTHER PUBLICATIONS

"Color Television Screening by the Slurry Process", Theodore Saulinier, Electrochemical Technology, vol. 4, Jan.-Feb. 1966.
"Emulsion Filming for Color Television Screens", Theodore Saulinier, Electrochemical Technology, vol. 4, Jan.-Feb. 1966.

Primary Examiner—Robert L. Lindsay, Jr.
Attorney, Agent, or Firm—Charles E. Pfund

[57] ABSTRACT

When fusing together a panel having a fluorescent film and a metallic reflective film, and a funnel with an electroconductive film in a baking furnace for manufacturing a cathode ray tube, oxygen containing air is forced into the furnace.

6 Claims, 3 Drawing Figures

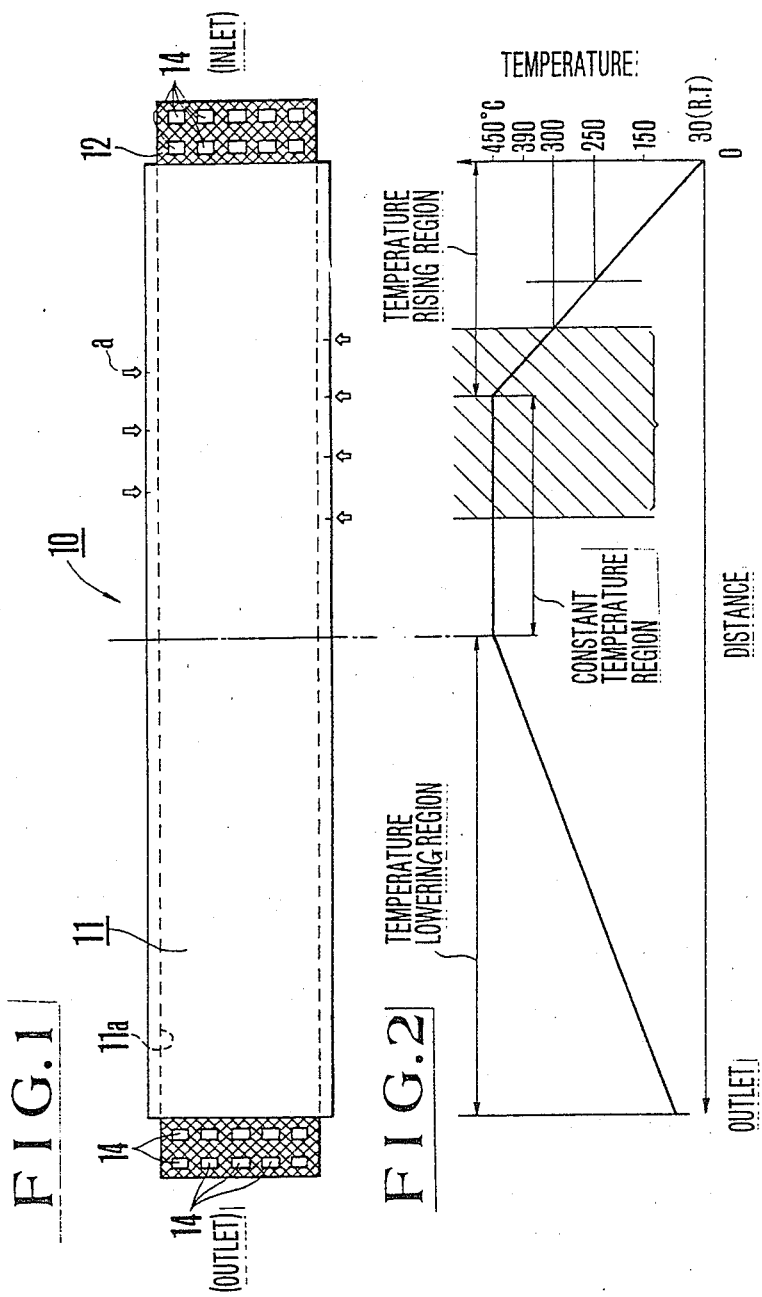

METHOD FOR MANUFACTURING CATHODE RAY TUBES

BACKGROUND OF THE INVENTION

This invention relates to a method and apparatus for manufacturing a cathode ray tube.

Generally, a panel or face plate and a funnel of a cathode ray tube are prepared independently and then fused together, usually with frit glass to form an envelope.

The steps of preparing the panel and the funnel will firstly be described. Firstly, the panel is applied with a phosphor film, an organic resin film, a metallic reflective film, i.e., a metal back and when desired, nonluminous black matrix film (hereinafter termed a BM film) and then the coated panel is baked in a furnace for burning off an organic substance utilized to coat the phosphor and the organic resin film. An electroconductive material such as graphite is applied to the inner surface of the funnel to form a conductive film.

A slurry method or air setting method is used to form a phosphor film on the inner surface of the panel, and an emulsion method, or a spray method is used to form the organic resin film. Such techniques have already been well known in the art as disclosed in "Color Television Screening by the Slurry Process" and "Emulsion Filming for Color Television Screens" both written by Theodore A. Saulnier, Jr. Electrochemical Technology Vol. 4, Nos. 1-2, p. 27-34, January-February, 1966.

After these treatments, the panel and funnel are fused together with frit glass in a furnace to form the envelope.

To simplify the manufacturing step in recent years, it has been proposed to execute the panel baking and fusion with frit glass by a single step as disclosed in Japanese Preliminary Publication of Patent Specification No. 123654/78 dated Oct. 28, 1978. We have found that such simplified method accompanies the following problems.

Thus, to decompose the organic material in the phosphor film during the panel baking step, substantially large quantity of oxygen is consumed and since air is supplied into the furnace only through the inlet port and the exit port of the furnace, the amount of oxygen supplied into the furnace is not sufficient.

With the prior art panel baking process only the panel is baked so that as the contact surface with air is large, a large quantity of oxygen consumption at the time of decomposing the organic substance causes no serious problem, whereas with the simplified process, under the assembled state of the panel and funnel, the area through which air is introduced into the assembly is limited to the area of the neck opening of the funnel.

In a 20 inches television picture tube, the ratio of the area of the funnel neck opening to the area of the panel is about 1/260. Thus, in the simplified method in which the panel baking and fusion of the panel and the funnel are performed simultaneously, the area of the funnel neck is too small to introduce a quantity of air sufficient to satisfy a large quantity of oxygen consumption at the time of decomposition of the organic substance. Usually, since the panel baking is effected while sucessively conveying a large number of tube assembly by a conveyor, a relatively long heating furnace with an inlet and an outlet at both ends is generally used. With such a furnace the ratio of the length of the furnace to the areas of the inlet and exit openings is large so that it is difficult to supply sufficient quantity of air into the heating portion of the furnace. For example, in a furnace having a length of 40 m and passed by 100 tube assemblies per hour, an oxygen concentration of 21.5% (calculated at 20° C. at a time immediately after starting the operation) has decreased to 17% after 24 hours, whereas where the assembly is passed at a rate of 150 per hour the oxygen concentration decreased to 15.5%. The result of our experiment shows that the oxygen concentration decreases with time.

When the quantity of oxygen in the furnace becomes defficient as above described, the decomposition of the organic substance does not undergo completely, with the result that the organic substance remains as a carbonized state thus decreasing the brightness of the completed color picture tube. In addition, presence of not yet decomposed organic substance increases the quantity of impurity gasses in the tube thereby shortening the effective life of the tube and electro emission of electron guns. For this reason, where the panel baking is performed concurrently with panel-funnel fusion the quality of the product is degraded.

One may consider that such problem might be solved by enlarging the inlet and exit openings of the furnace. Such measure, however, not only makes it difficult to realize a desired schedule of rising and lowering the temperature in the furnace but also increases energy necessary to heat the furnace.

For this reason, according to the Preliminary Publication of Patent Specification cited above, a nozzle is inserted into the funnel opening of each tube assembly passed through the baking furnace so as to forcibly circulate the air in the tube. With this method, however, a nozzle attached to each tube assembly passed through the baking furnace admits air short of oxygen prevailing in the furnace into the tube assembly, so that it is impossible to introduce a sufficient amount of air into each tube assembly.

SUMMARY OF THE INVENTION

Accordingly, it is a principal object of this invention to provide an improved method and apparatus for manufacturing a cathode ray tube which when panel-funnel fusion and panel baking are effected simultaneously can prevent depletion of oxygen in the baking furnace, thus increasing the thermal efficiency at the time of baking and preventing decrease in the brightness of the completed tube caused by the baking treatment as well as shortening of the tube life.

Another object of this invention is to provide a method and apparatus for manufacturing cathode ray tubes which are suitable for mass production.

According to one aspect of this invention there is provided a method of manufacturing a cathode ray tube including a panel having an inner wall coated with a phosphor film and a metallic reflective film, comprising the step of fusing the panel with a funnel with its inner surface coated with an electroconductive film, the fusing step being carried out by sucessively passing through a baking furnace a plurality of tube assemblies each comprising an assembly of a funnel and a panel with frit glass interposed therebetween, characterized in that oxygen containing gas is forced into the backing furnace during the fusing step.

According to another aspect of this invention there is provided apparatus for manufacturing a cathode ray tube, characterized by comprising a baking furnace including inner and outer shells, a plurality of hot gas circulating ducts disposed between the inner and outer shells, a fan disposed between the inner and outer shells for circulating the hot gas through the furnace via the ducts, conveyor means for successively passing a plurality of tube assemblies through the baking furnace and means for supplying oxygen containing gas into a space between the inner and outer shells.

BRIEF DESCRIPTION OF THE DRAWINGS

In the accompanying drawings:

FIG. 1 is a top plan view of a baking furnace embodying the invention;

FIG. 2 shows a temperature characteristic of the furnace shown in FIG. 1; and

DESCRIPTION OF THE PREFERRED EMBODIMENT

Figure 3:
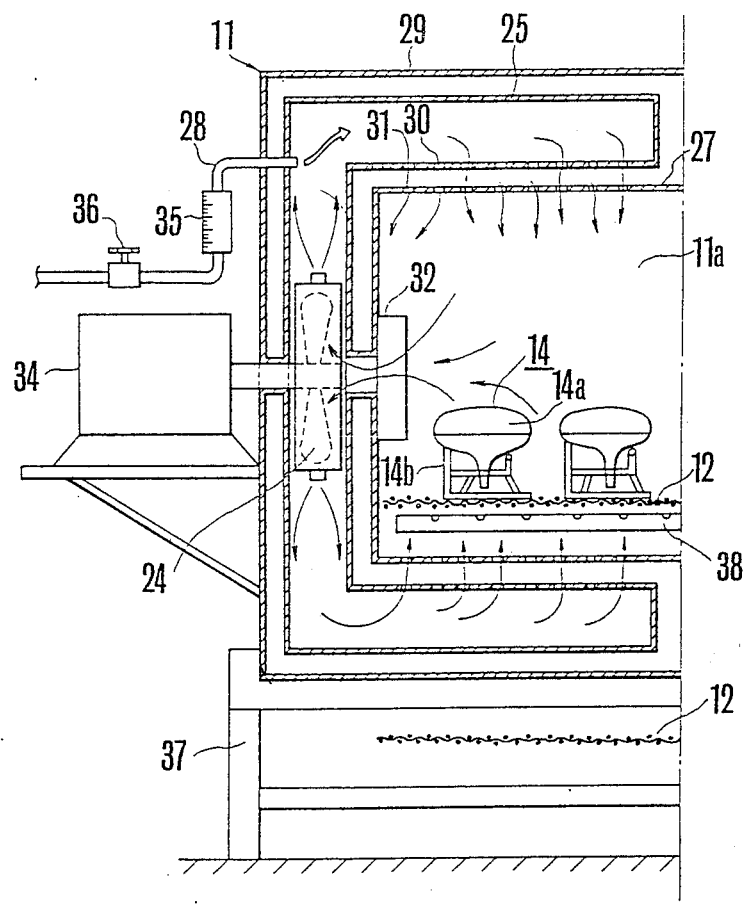
FIG. 3 is a cross-sectional view showing one half of one end of the baking furnace according to this invention.

As shown in FIG. 1, a baking furnace 10 embodying the invention has an elongated configuration, and a space 11a having a rectangular cross-section is formed in the interior of the main furnace body 11 for containing a mesh shaped endless belt conveyor 12. A plurality of (in this example 5) tube assemblies (each including a panel and funnel to be fused together with frit glass) supported by supporting members 14b are juxtaposed in the transverse direction on the conveyor 12. These juxtaposed tube assemblies 14 are sequentially fed into the furnace 10 through an inlet opening at one end thereof. An electric heater, not shown, is installed in the furnace 10 to produce a temperature distribution as shown in FIG. 2.

As shown, the temperature distribution comprises a temperature rising region, a constant temperature region and a temperature lowering region starting from the inlet port. The temperature of the constant temperature region is 450° C., for example, and the length thereof is about ¼ of the total length of the furnace, while the length of the temperature lowering region is about one half of the total length. The length of the temperature rising section is also about ¼ of the total length. Consequently, assuming a stay time of 4 hours, the temperature rising time is one hour, the constant temperature time is one hour and the temperature lowering time is 2 hours.

Usually, the furnace of the type described above is provided with a fan for sucking ambient air into the furnace so that it is possible to change the inclination of the temperature lowering curve.

Since the temperature rising region and the constant temperature region are utilized for heating the assemblies, many efforts have been made regarding dissipation of heat thus saving energy. For this reason, it has been unnecessary to admit external air into the temperature rising region and the constant temperature region.

In contrast, according to this invention, air is admitted into the furnace at a point of the temperature rising region where the temperature is about 300° C. Thus, an oxygen containing gas is forced into the furnace to prevent depletion of oxygen at the time of decomposition of the organic resin. The oxygen containing gas, usually ambient air, is admitted at positions indicated by arrows a. In this example, the number of air inlet ports is 7. Air is admitted at portions of about 450° C. until the organic resin completely decomposes and the frit glass perfectly fuse together the panel and the funnel. Then admission of air is stopped and the constant temperature heating is continued according to a predetermined schedule. The assemblies are then passed through the temperature lowering region to complete the baking operation. In this embodiment, the quantity of air flow was adjusted to be 20 l per one tube. As a result of the simultaneous panel baking and fusion with frit glass, the color cathode ray tube had the same brightness as that prepared by the prior art method in which panel baking and fusion with frit glass were performed independently.

A tube prepared according to this invention having a life of 10,000 hours and in which impurity gasses in the tube were decreased was found to be comparable with a tube prepared by the prior art method.

The method of admitting gas into the furnace and the quantity of the admitted gas will be described as follows.

(1) Two methods of admitting air into the furnace were tested. According to one method atmospheric air is directly admitted into the furnace through a duct (direct method) and according to the other method the air is introduced into an air circulating system (indirect method).

With the direct method, although it is possible to make uniform the temperature difference, the external air has a tendency to form crack in the tubes.

According to the indirect method, however, since the air is admitted into the furnace after being admixed with furnace atmosphere, there is no disadvantage just described.

(2) It was found that the minimum quantity of a the external air to be introduced into the furnace is about 6 l/panel as evidenced by the equation of oxydation decomposition of the organic substance contained in the phosphor film. When considering the replacement efficiency, the quantity of air actually required is from 4 to 6 times of the theoretical value.

While the quality of the air in the furnace is improved as the quantity of air admitted into the furnace is increased, as above described, temperature decreases in the temperature rising region and the constant temperature region results in a detrimental effect. The result of our experiment shows that when the quantity of air decrease exceeds 20 times of the theoretical value it becomes difficult to maintain the desired temperature.

Increase in the number of burners permits introduction of air of more than 20 times, but this is not advantageous from the point of view of cost.

(3) Optimum range of air admission usually lies in the fore half of the uniform heating region although the decomposition of the organic substance in the phosphor film starts at about 300° C. and its end point is determined by an index. Accordingly, the most effective region of air admission is from a point at a temperature of 300° C. to the middle of the uniform heating region. Although high or low pressure air is usually used it should be understood that any oxygen containing gas can be used.

FIG. 3 shows the detail of one example of a furnace utilized in this invention. As shown, the furnace atmosphere is sucked by a fan 24 and ejected into the furnace inner shell 27 that constitutes a cavity 11a of the furnace main through c shaped ducts 25 and the openings through the ceiling and the bottom of the furnace 10. Actually, ducts 25 are disposed symmetrically with respect to the central axis of the furnace, and several pairs of the ducts are provided in the direction of movement of the conveyor belt 12. Each pair of ducts may be combined into an annular to surround the cavity 11a of the main furnace body°. The illustrated system of circulating air is adopted to make uniform the temperature distribution in the furnace. Instead of locating the fan 24 on the side of the furnace, it may be located above the ceiling.

An outside air supply tube 28 is provided with one end opened in the atmosphere or connected to a source of air and the other end opened through the furnace outer shell 29 so as to supply outside air into the duct 25. The air admitted through the air supply tube 28 is admixed with the air in the duct 25 to be heated. Consequently, heated air is blown into the furnace inner shell 27 through openings 30 of the inner shell 27.

An assembly 14 shown in FIG. 1 is shown in FIG. 3 as comprising supporting members 14b and tube assemblies 14a mounted thereon. As shown in FIG. 3, an air suction duct 32 is mounted on the inner wall of the inner shell 27 and the air sucked through the suction duct 32 is discharged into the duct 25 by the fan 24. The fan 24 is driven by an electric motor 34 and the quantity of the air forced into the furnace through supply pipe 28 is measured by a flow quantity meter 35 and the quantity is controlled by a valve 36. The furnace 10 is supported by a base structure 37. Further, below the conveyor belt 12 in the cavity 11a of the main furnace body 11 is the heat source 38 such as gas burner or electric heating coil.

As above described, according to this invention it becomes possible to simultaneously perform the panel baking and fusion of the panel and funnel with frit glass.

Moreover, as it is possible to supply oxygen of the required quantity, it is possible to prevent decrease in the brightness of the color picture tube and the life of the tube thus prepared is comparable with that of the tube prepared by the prior method in which the panel baking and fusion with frit glass are performed with independent process steps. Accordingly the cathode ray tube according to this invention has characteristics comparable with those of the prior art tube. Furthermore, the external gas is admitted into the furnace with the indirect method, the control of the furnace temperature becomes easy. In addition, there is no fear of tube cracking.

It should be understood that the invention is not limited to the specific embodiment described above and the many changes and modifications would be obvious to one skilled in the art without departing from the true spirit and scope of the invention as defined in the accompanying claims. For example, the invention is not limited to a color picture tube but may be applicable to any cathode ray tube, such as a white and black picture tube including a panel and funnel.

What is claimed is:

1. In a method of manufacturing a cathode ray tube including a panel having an inner wall coated with a phosphor film an organic film and a metallic reflective film; comprising the step of fusing said panel with a funnel with its inner surface coated with an electroconductive film, said fusing step being carried out by successively passing through a baking furnace a plurality of tube assemblies each comprising an assembly of a funnel and a panel with frit glass interposed therebetween, the improvement wherein oxygen containing gas is forced into said baking furnace during said fusing step said oxygen containing gas being in an amount sufficient to prevent depletion of oxygen due to decomposition of the organic film.

2. The method according to claim 1 wherein said cathode ray tube comprises a color picture tube.

3. The method according to claim 1 wherein said cathode ray tube comprises a black and white picture tube.

4. The method according to claim 1 wherein said gas is admitted into said baking furnace in a region thereof in which temperature in the furnace is gradually raised and then maintained at a constant value.

5. The method according to claim 4 wherein said gas is forced into said baking furnace in a temperature rising region and in about one half of a constant temperature region following the temperature rising region.

6. The method according to claim 1 wherein quantity of said gas admitted into said furnace is less than 20 times of that required to bake said phosphor film.

* * * * *